INVENTORS:
STEPHEN P. EMMONS
WALTER T. MATZEN, JR.
HILTON W. SPENCE

BY John D. Graham
ATTORNEY

United States Patent Office 3,354,565
Patented Nov. 28, 1967

3,354,565
PASSIVE INFORMATION DISPLAYS
Stephen P. Emmons, Walter T. Matzen, Jr., and Hilton W. Spence, Richardson, Tex., assignors to Texas Instruments Incorporated, Dallas, Tex., a corporation of Delaware
Filed Feb. 1, 1966, Ser. No. 524,183
5 Claims. (Cl. 40—28)

This invention relates to information displays, and more particularly to information displays of the type which utilize temperature changes for their operation, and means for limiting these temperature changes.

Within the past several years, research and development has been carried out in search for effective means of information display. This search has been particularly extensive in the field of aircraft and space vehicle applications where a desire for fast response time, high resolution, and brightness in a high light level environment imposes stringent requirements upon any display design.

In U.S. patent application, S.N. 504,569, filed Oct. 24, 1965, and assigned to the assignee of the instant application, an improved form of information display is described, capable of being easily seen in a high light level environment. The display described therein consists essentially of two portions; first, a thermal drive comprising an array of resistive heating elements which are selectively heated when an input voltage pulse causes current to flow through select heating elements; and second, a layer of thermochromic material (material which changes color with corresponding changes in temperature) overlying the array of resistive heating elements. When the select resistive elements are heated above the transition temperature at which the thermochromic material changes color, the portions of the thermochromic layer which overlie the select heating elements change color and hence display information.

For example, assume that a layer of thermochromic material that changes color from red to black at 70° C. is formed over the array of resistive elements. If the latter "A" is to be displayed, the array of resistors are selectively heated to a temperature of 70° C. or above in a pattern corresponding to the the letter "A." The overlying thermochromic layer then selectively changes from red to black in the corresponding pattern and thus displays the letter "A," the unchanged red material providing the background for the black "A."

The operation of the display therefore requires that the input pulse or pulses provide sufficient power to raise the temperature of the thermochromic layer to its transition temperature (70°) for the lowest ambient temperature encountered. Thus, if the temperature of an airplane cockpit in which the display is to operate ordinarily fluctuates as low as 0° C., the input pulses must be programmed to furnish sufficient current to raise the selected portions of the thermochromic layer by seventy degrees centigrade.

The difficulty occurs, however, when the ambient temperature of the cockpit rises to say, 40° C. An input pulse programmed to raise the thermochromic layer by a factor of seventy degrees then causes a total temperature increase to 110° C., a temperature that often is sufficient to cause a permanent color change of the thermochromic material. Even if the permanent change does not occur, the response time of the display is reduced due to the excess heat that must be dissipated in order to cool the thermochromic material below its transition temperature before another letter may be displayed in the same matter.

It is therefore a primary object of the present invention to provide an improvement for the information display described and claimed in the above referenced patent application by providing a means for limiting the temperature rise of the thermochromic layer above the transition temperature point of this layer. It is an even broader object of the invention to provide a means for limiting the temperature variation in all types of information displays which utilize a temperature or thermal drive in their operation.

In accordance with these and other objects, the resistive heater elements of the thermal drive of the information display are formed of a material which exhibits a large positive temperature coefficient of resistance. These PTC (positive temperature coefficient) elements not only act as heaters, but also as their own temperature regulators. When an input pulse or pulses cause current to flow through the resistive elements, the temperature of these elements increases, thereby raising the temperature of the thermochromic layer. At a particular temperature (referred to as the "break point") the resistance of the PTC material sharply increases, causing a drop in current for a constant input voltage, and consequently limiting the temperature rise in the PTC heater elements and the overlying thermochromic layer. This "break point" may be established slightly above the transition temperature of the thermochromic layer, therefore limiting the temperature rise of the thermochromic layer essentially to this value, even when the ambient temperature fluctuates.

The noval features believed characteristic of this invention are set forth in the appended claims. The invention itself, however, as well as other objects, features and advantagee thereof, may best be understood by reference to the following detailed description when read in conjunction with the accompanying drawings, in which:

Before describing the fabrication of the present invention it would be useful to define a number of terms that will be utilizied in the specification and the appended claims. The term "array" has reference to the overall pattern of the plurality of individual heating elements. The term "character" is used to describe individual groupings of heating elements, the characters being spaced from one another, the characters and their spacing making up the "array."

Figure 1:
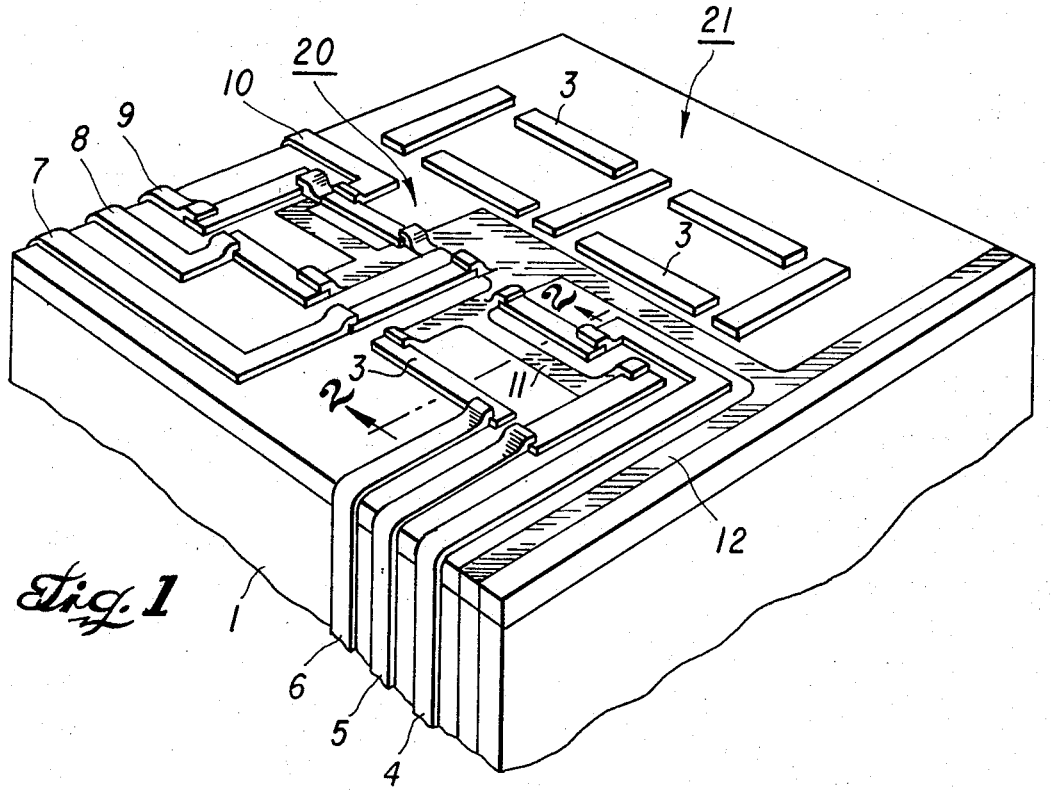
FIGURE 1 is a pictorial view of one embodiment of the thermal drive of the display of the invention before the application of the thermochromic layer.

With reference to FIGURE 1, there is now described the initial steps in the fabrication of one embodiment of a display device in accordance with the present invention. A plurality of thin resistors 3 are selectively located in a desired array upon a substrate 2 of high resistivity material, alumina for example. The array shown in FIGURE 1 forms the characters 20 and 21, each character comprising 7 resistors.

In accordance with the improvement of the present invention, the resistors 3 are formed of any suitable material exhibiting a positive temperature coefficient of resistance, and deposited by any suitable technique. Examples of some of the PTC materials that may be used will subsequently be described. The seven resistor bars of each character may be approximately 5 mils by 70 mils, and approximately 0.5 mil thick.

Evaporated metal leads, as 4–10, formed of gold for example, respectively make connection to one end of each of the resistors 3 of character 20. The other end of the resistors may be tied together by the interconnection 11 and the lead 12. A similar interconnection pattern may be formed for the character 21. The structure is mounted upon a heat sink 1 which may be a copper block, for example, with the leads appropriately insulated from one another, the final structure constituting the "thermal drive."

Figure 2:
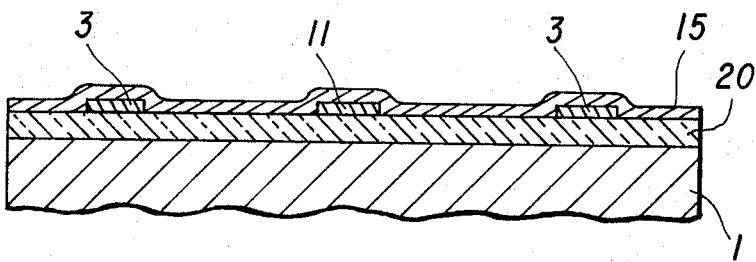
FIGURE 2 is a sectional view of a portion of the structure shown in FIGURE 1, taken along the section line 2—2 after the application of the thermochromic layer.

A layer 15 of thermochromic material is deposited over the substrate 2, resistor array, and interconnections, as shown in FIGURE 2, to a thickness of approximately 0.5 to 5 mils. The thermochromic material may be deposited directly by sublimation, for example, or the material may be pulverized and mixed with a binder such as the organic glues or silicone greases or resins, and spread over the face of the array.

Figure 3:
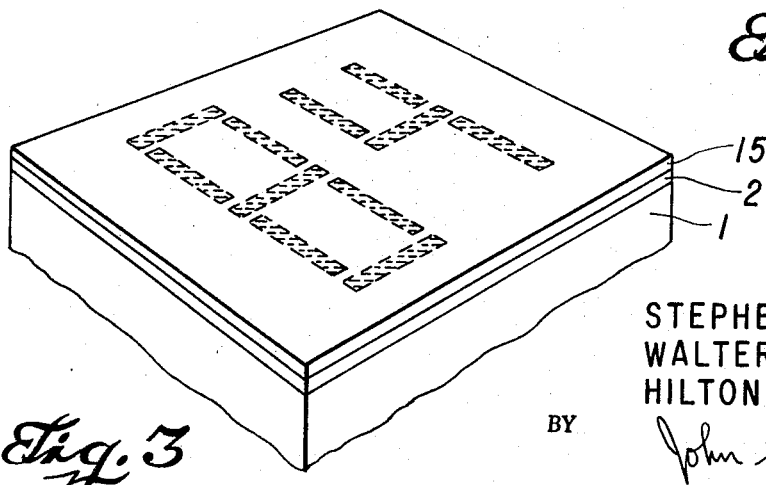
FIGURE 3 is a pictorial view of the device of FIGURE 2 showing the operation of the device, displaying the numerals "8" and "4"

The actual operation of the display device may be accomplished by various techniques and is not restricted to any one method. For example, the lead 12 shown in FIGURE 1 may be grounded (or placed at negative potential), and a positive voltage pulse applied to selected leads, such as 4–10, the difference in voltage causing current to flow through the select PTC resistors 3, these selected resistors thus heating up. The increase in heat in the resistors causes the portions of the thermochromic layer 15 that overlie the selected resistors to correspondingly heat up, and when the temperature of these portions reach the transition temperature of the material, they change color, thus displaying the information desired. As shown in FIGURE 3, selected resistors of the characters 20 and 21 were energized to display the numerals "8" and "4," respectively. In like manner, other resistors may be selectively energized to heat the correspond overlying portions of the thermochromic material to other numbers, letters, figures, etc. The selection of the proper leads (and therefore the resistors) to be energized may be accomplished manually or by a more complex electronic drive logic scheme.

As previously described, by using positive temperature coefficient material (PTC) for the resistive heating elements 3, the temperature rise of the thermochromic layer 15 may be limited to a point just above the transition temperature of the layer 15. Various PTC materials may be used for this purpose. For example, lanthanum doped barium titanate of the type $Ba_{a1-x}La_{ax}TiO_3$ may be utilized. Small additions of strontium and/or lead to this system allows one to shift the temperature of the PTC "break point" to the desired value. The "break point" as defined in this patent is the point at which there is an abrupt or sharp increase in resistance for a small increase in temperature.

Figure 4:
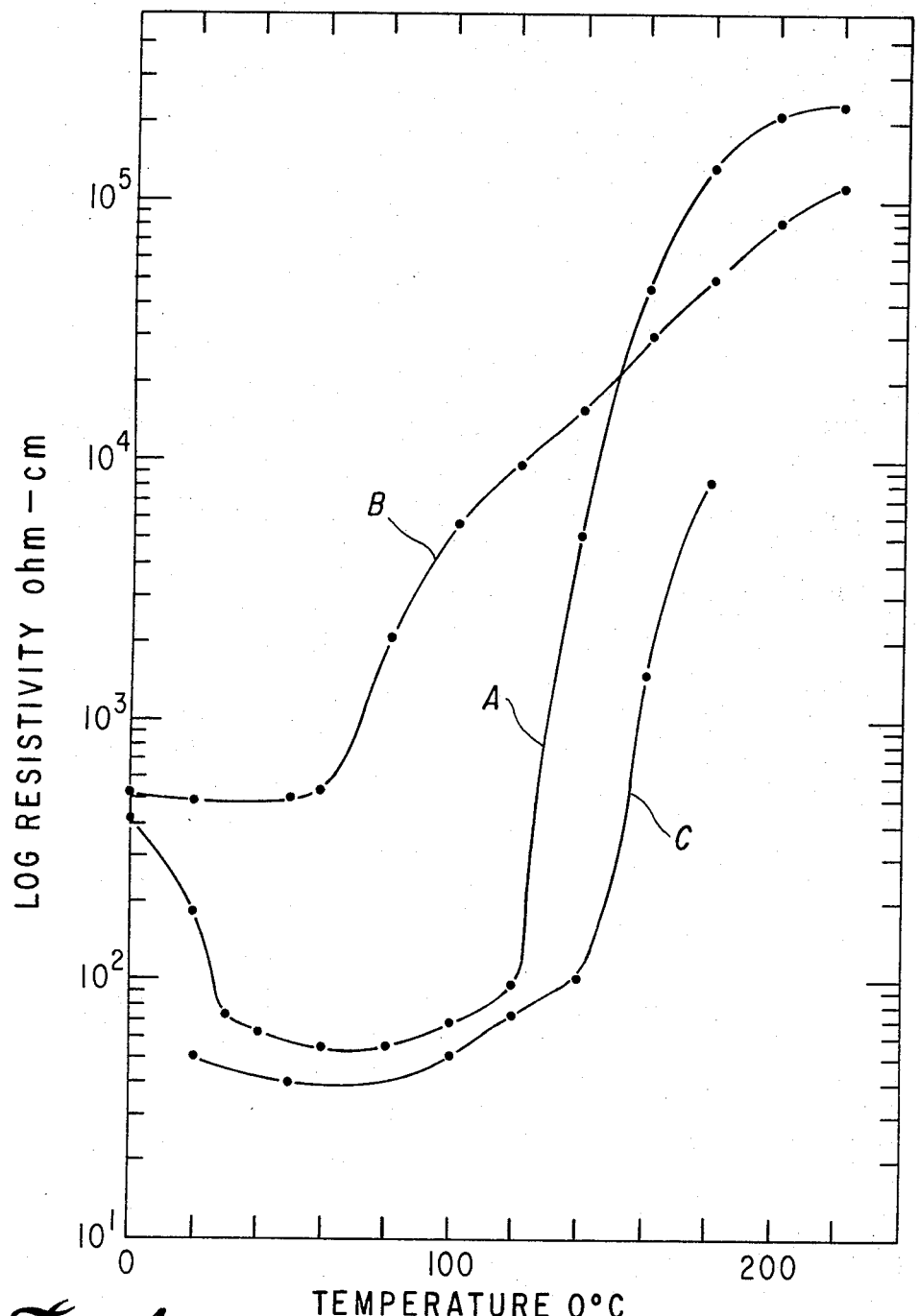
FIGURE 4 is a graph of the resistivity-temperature characteristics of three representative samples of PTC materials used as the heater elements of the thermal drive of FIGURE 1.

Referring to FIGURE 4, Curve A represents the log plot of resistivity vs. temperature change for the compound $Ba_{.997}La_{.003}TiO_3$. As observed, the "break point" for this compound occurs at approximately 110° C. Curve B represents a plot for the strontium doped compound $Ba_{.897}Sr_{.1}La_{.003}TiO_3$ the break point occurring at approximately 60° C.; and Curve C represents a plot for the lead doped compound $Ba_{.972}Pb_{.025}La_{.003}TiO_3$, the break point occurring at about 90° C.

By choosing a material that has a break point at a temperature slightly in excess of the transition temperature of the particular thermochromic material, the temperature of the PTC resistive elements will rise until the thermochromic transition temperature is reached (thus changing the color of the portions of the thermochromic layer overlying the elements), the temperature then stabilizing at about the break point or slightly higher until the input pulse is turned off, at which time the temperature decreases and "turns off" the display. Thus, the thermochromic layer is kept from overheating.

Figure 5:
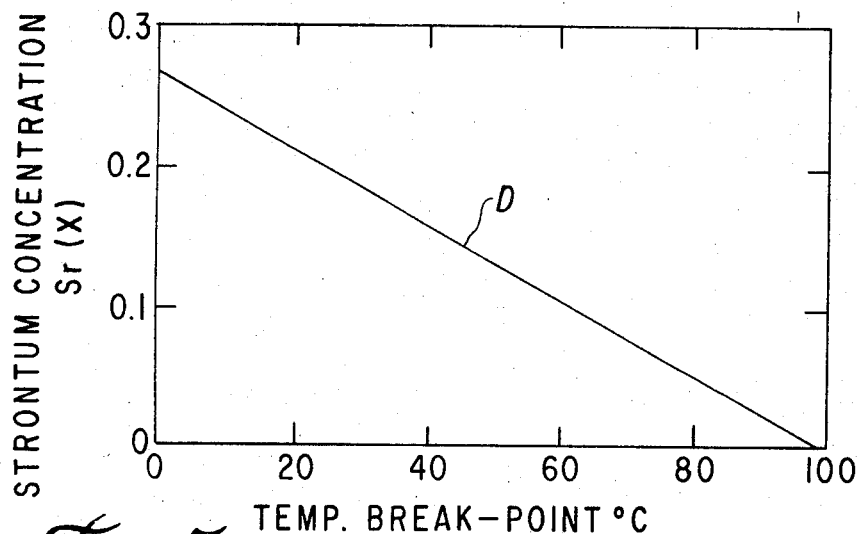
FIGURES 5 and 6 are graphs of the break points of various PTC materials as a function of dopant concentration.
Figure 6:
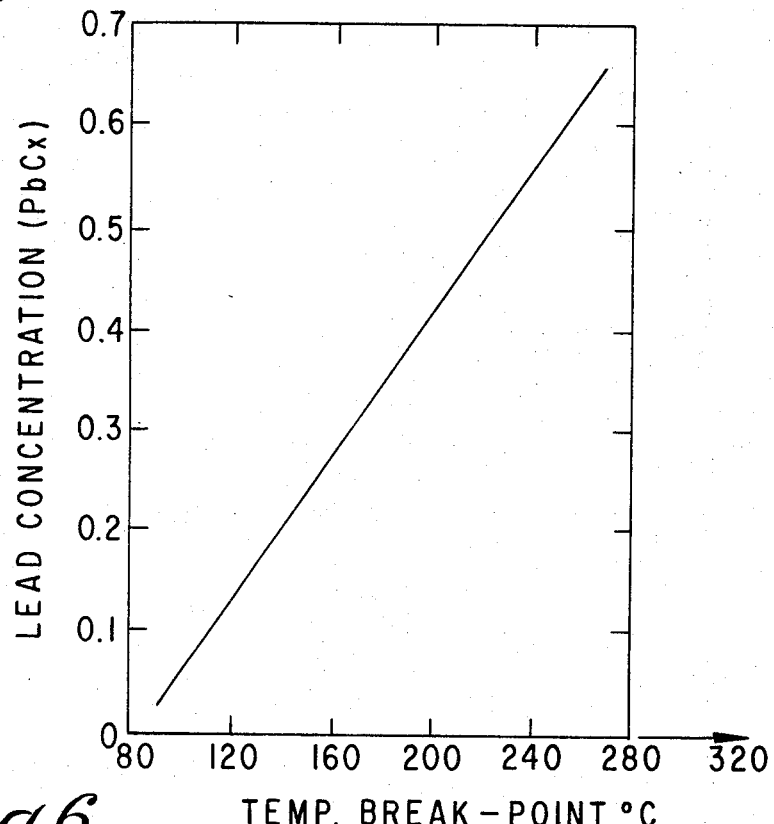

As observed from FIGURE 5, additions of strontium to the $BaLaTiO_3$ system enables one to adjust the break point from approximately 0° C. to 100° C. The particular plot shows the effect of the addition of strontium to the compound $Ba_{.997-x}La_{.003}Sr_xTiO_3$ where $x$ represents the increase of strontium. FIGURE 6 illustrates the variation of break point for additions of lead to the compound $Ba_{.997-x}La_{.003}Pb_xTiO_3$.

Many different thermochromic materials are available, each material having various characteristics, their use for the layer 15 depending upon the particular design considerations. Among these various characteristics are: phenomenon causing color change, thermal properties, thermal response, physical and chemical stability.

The change of color with change in temperature associated with thermochromic materials may be attributed to two distinct phenomena. One phenomenon may be referred to as color "shift," and is due to the increased absorption of high energy photons (short wave length light) as the material is heated. The observed color is due to the light not absorbed, and the color proceeds or "shifts" *gradually* through some portion of the chromatic scale as follows:

heating ⟶

| white | violet | blue | green | yellow | orange | red | brown | black |

⟵ cooling

For example, mercuric iodide ($HgI_2$) is orange at low temperatures and becomes increasingly dark red in color as the temperature approaches 127° C.

Many materials, however, undergo a rapid color change over a small temperature interval, a change that occurs from one region of the chromatic scale to another, and not necessarily in the same direction. This color change is not due to a color "shift," but rather to changes in energy absorption caused by alterations of the crystallographic structure of the thermochromic material itself, brought about by the temperature variations. Thermochromic materials which exhibit this phenomenon (often called phase change) have a special appeal for use in the display device of this invention, since their color change is sharp and dramatic rather than gradual.

Of the thermochromic materials that exhibit this phase change, the materials that are suitable have been found to be the iodides and bromides of the form MX, $MX_2$, $M_2$, $X_2$, and the coordination compounds of the form $M_2M_1X_4$, where the M's are 1B elements from the periodic table (copper sub-group), or the outer transition elements from the sixth period. The X's are the halide elements. Some of these materials are listed along with their color changes and approximate color change transition temperature:

| Thermochromic Material | Transition Temperature, ° C. | Color Change |
| --- | --- | --- |
| CuI | 61 | White to orange. |
| AgI | 145 | Yellow to brown. |
| HgI | 75 | Yellow to orange. |
| TlI | 190 | Do. |
| HgBr | 70 | White to yellow. |
| TlBr | 168 | White to pale yellow. |
| $HgI_2$ | 127 | Red to yellow. |
| $PbI_2$ | 210 | Orange to red. |
| $HgBr_2$ | 105 | White to yellow. |
| $Cu_2HgI_4$ | 70 | Red to black. |
| $Ag_2HgI_4$ | 51 | Yellow to brown. |
| $Pb_1HgI_4$ | 134 | Orange-red to yellow. |
| $Hg_2HgI_4$ | 160 | Yellow-orange to red. |
| $Tl_2HgI_4$ | 170 | Yellow to yellow-orange. |
| $Cu_2PbI_4$ | 172 | Yellow to tan. |
| $Ag_2PbI_4$ | 122 | Yellow to brick red. |
| $Tl_2PbI_4$ | 210 | Yellow to dark brown. |
| $Hg_2PbI_4$ | 200 | Do. |

These changes have been found to be reversible upon cooling. Other inorganic compounds, such as oxides, sulfides, chromates, borates, and coordination complex compounds, as well as numerous organic compounds are thermochromic, changing color at the transition temperature, and reverting back to the original color upon cooling:

| Thermochromic Material | Approximate Transition Temperature, ° C. | Color Change |
|---|---|---|
| $Cu_3(BO_3)_2$ | 140 | Blue to yellow-green. |
| $PbCrO_4$ | 160 | Yellow to dark brown. |
| $HgO$ | 100 | Red to brown. |
| Di(N,N-diethylene diamine), copper (II perchlorate). | 42 | Ruby red to deep blue. |

The thermochromic material chosen for the layer 15 should also have physical stability (for example, able to withstand high temperature operations without vaporizing); chemical stability (will not decompose or react unfavorably in the surrounding environment or with the adjacent materials as leads, substrate, etc.); and should be easily and conveniently applied to the underlying substrate over the heater array (preferably by sublimation). The layer 15 should have low specific heat and be as thin as possible in order to reduce thermal inertia, thus enabling the display to be turned "off" and "on" quickly, as well as to quickly dissipate the heat from the layer 15 after display in order to avoid heat "spillover" through the thermochromic material to other portions of the layer 15 that are not to change color. The thermochromic material chosen should also be of sufficient electrical resistivity to avoid any current shunt paths through the layer 15.

As mentioned above, it is ordinarily desired that the display turn on and off sharply, thus requiring that the thermochromic material change color quickly when the transition temperature is reached (exhibit little or no super heating) and revert sharply to its original color when the power is turned off and the material cools below its transition temperature (exhibit little or no undercooling). In some instances, however, it may be desirable to display a piece of information as a letter, number, etc., for a relatively long period of time. This may be accomplished, of course, by continuously pulsing the particular leads, thus keeping the select portions of the thermochromic materials above the transition temperature. Alternatively, however, it may be desirable to employ a thermochromic material which may be undercooled below the transition temperature without immediately reverting back to its original color, thus providing a more persistent display. One material which exhibits this hysteresis effect is $HgI_2$ which changes sharply from red to yellow when heated to the transition temperature of 127° C., but does not regain its original color of red until the temperature is lowered to approximately 90° C.

While no one thermochromic material will necessarily meet, nor need meet, every single one of the above requiremnets, these factors should be considered, and the selection of the appropriate material be chosen with regard to the particular application.

When the thermochromic layer 15 of FIGURES 2 and 3 is deposited by mixing the thermochromic material with a binder and spread over the heater array, the binder essentially serves two purposes: (1) it holds the thermochromic material in *physical* contact with the substrate 2 and the heater array, and (2) it holds the thermochromic material in thermal contact with the array of heating elements. As previously mentioned, various types of binders may be utilized. At operating temperatures from 100° C. to 250° C., organic polymers may be used, while above 250° C. it may be desirable to use silicone resins. In addition to having many of the same desirable properties discussed with respect to the thermochromic material, the binder material should be substantially transparent so as to not interfere with the display properties of the thermochromic layer 15.

The material of which the substrate 2 is fabricated should exhibit both sufficient electrical resistivity to insure electrical isolation between the leads and resistors, and sufficient thermal isolation to avoid heat spillover. In adidtion, the substrate 2 should have sufficient thermal conductivity to allow quick cooling of the resistors and thermochromic material after each display. One material which offers a suitable compromise between these desired objectives is alumina. The block 1 should be of a material that allows its use as a heat sink, for example copper, but should be fabricated in a manner that allows the leads 4–10, for example, to be electrically isolated from one another. This may be accomplished by conventional techniques, as providing slots in the side of the block for the leads, the slots being coated with an insulating material.

Various modifications of the disclosed embodiment may be made without departing from the scope of the invention. The PTC heater elements may be utilized with other types of thermal printers or displays besides the thermochromic display described herein. For example, they can be used as the heater elements in a thermal printer that prints on thermal sensitive paper. Other design modifications may be made by one skilled in the art without departing from the spirit and scope of the appended claims.

What is claimed is:

1. In an information display of the type utilizing a thermal drive in cooperative relationship with display material responsive to changes in temperature,
   (a) an array of heating elements upon one surface of a substrate, select ones of said elements defining a form of information representation,
   (b) said heating elements being formed of a material which exhibits a positive temperature coefficient of resistance, thereby to limit the temperature rise of said heating elements.

2. An information display device, comprising:
   (a) a substrate,
   (b) an array of PTC heating elements upon one surface of said substrate, said array being so arranged that select ones of said PTC elements define a form of information representation,
   (c) a layer of thermochromic material overlying said array, and
   (d) means for energizing said select ones of said PTC heating elements, thereby to cause portions of said thermochromic layer overlying said select ones to change color and display said form of information representation.

3. The device as described in claim 1 wherein said form of information representation is a letter of an alphabet.

4. The device as described in claim 1 wherein said form of information representation is a number.

5. A passive display device, comprising:
   (a) a substrate,
   (b) an array of resistors upon one surface of said substrate, said array being so arranged that select ones of said resistors of said array define a form of information representation, said resistors being formed of a material which exhibits a positive temperature coefficient of resistance,
   (c) a layer of thermochromic material overlying said array, and
   (d) means for producing current in said select ones of said resistors, thereby to heat said select ones and cause portions of said thermochromic layer overlying said select ones to heat to the transition temperature of said thermochromic layer and change color thus displaying said form of information representation, said resistors limiting the temperature rise in the thermochromic layer to a point slightly above said transition temperature.

References Cited

UNITED STATES PATENTS 2,992,993 1/1960 Sack.
3,133,221 5/1964 Knochel.
3,210,876 10/1965 Towne _____ 40—130
3,225,470 12/1965 Schwab et al. _____ 40—130

EUGENE R. CAPOZIO, *Primary Examiner.*

W. J. CONTRERAS, *Assistant Examiner.*